United States Patent [19]

Brandt, Jr.

[11] Patent Number: 4,579,137

[45] Date of Patent: Apr. 1, 1986

[54] ELECTRO-PNEUMATIC CURRENT TO PRESSURE TRANSDUCER AND PNEUMATIC AND ELECTRONIC CONTROL CIRCUITS THEREFOR

[75] Inventor: Robert O. Brandt, Jr., Lake Waccamaw, N.C.

[73] Assignee: Inotek, Inc., Fuquay, N.C.

[21] Appl. No.: 696,313

[22] Filed: Jan. 30, 1985

Related U.S. Application Data

[63] Continuation-in-part of Ser. No. 309,070, Oct. 6, 1981, abandoned.

[51] Int. Cl.[4] .................... G05D 16/00

[52] U.S. Cl. .................... 137/85; 137/82; 251/129.08; 251/129.16

[58] Field of Search .................... 137/82, 84, 85, 86, 137/487.5; 251/139, 129

[56] References Cited

U.S. PATENT DOCUMENTS

| | | | |
|---|---|---|---|
| 2,638,911 | 5/1953 | Griswold | 137/84 |
| 3,387,619 | 6/1968 | Berger | 137/86 |
| 3,586,287 | 6/1971 | Knobel | 251/139 X |
| 3,645,293 | 2/1972 | Pedersen | 137/82 UX |
| 3,817,488 | 6/1974 | Mack | 251/139 X |
| 4,481,967 | 11/1984 | Frick | 137/85 X |

*Primary Examiner*—Alan Cohan

*Attorney, Agent, or Firm*—Bell, Seltzer, Park & Gibson

[57] ABSTRACT

An electro-pneumatic transducer for converting an input current signal to a proportional output pressure signal is disclosed. The transducer includes housing means defining a chamber, the housing may be completely of magnetic material or may have a magnetic portion and a non-magnetic portion. The transducer includes an input communicating with the chamber for supplying a fluid under pressure thereto and having a valve seat with a nozzle opening therethrough, that portion of the nozzle forming the valve seat being formed of non-magnetic material while the remainder of the housing is of magnetic material or the valve seat may also be of magnetic material. The transducer also includes an output communicating with the inlet for allowing fluid supplied by the inlet to flow to a control device.

Disposed within the chamber is a membrane means in operative association with the nozzle opening in the valve seat for varying the fluid flow through the nozzle opening to thereby vary the fluid pressure at the output. The membrane also includes a magnetic portion and a non-magnetic or plastic portion. An electric coil is located within the chamber and surrounds a center post disposed within the chamber. Lastly, the transducer includes means for imparting a current signal to the electric coil to generate an electric field to magnetize the magnetic portions of the membrane and the housing, the degree of magnetization being proportional to the input current signal to position the membrane relative to the valve seat to thereby modulate the transducer output. Also disclosed are pneumatic and electronic control circuits for the transducer.

15 Claims, 3 Drawing Figures

ELECTRO-PNEUMATIC CURRENT TO PRESSURE TRANSDUCER AND PNEUMATIC AND ELECTRONIC CONTROL CIRCUITS THEREFOR

CROSS-REFERENCE TO RELATED APPLICATION

This application is a continuation-in-part of U.S. patent application Ser. No. 309,070 filed Oct. 6, 1981 now abandoned.

FIELD OF INVENTION

The present invention relates to instrumentation and to current to pressure transducers for converting an input current signal to a proportional output pressure signal. More particularly, the present invention entails an electro-pneumatic current to pressure transducer that utilizes an input current signal to generate a magnetic electric field that acts on a magnetic portion of a membrane for varying the output pressure of the electro-pneumatic transducer such that the output pressure is proportional to the input current signal for a given span.

BACKGROUND OF THE INVENTION

In flow control systems, it is desirable to utilize a fluid type actuator to drive a flow control element such as a mechanical valve disposed in the flow stream. Fluid actuators are very effective, reliable, and relatively inexpensive compared to the cost of a comparable electrical actuator that would require an electric motor.

Because of basic advancements made in electronics and electrical control systems over the past years combined with the ease in which electronics can be adapted to control systems, one often finds that the control signal to the actuator is in the form of an electric current signal. In order to accommodate fluid actuators in such control systems, the instrumentation industry has provided current to pressure converters, often referred to as I/P transducers. While I/P transducers of the prior art have met with success and are presently used in many control systems, they nevertheless have shortcomings and disadvantages.

Virtually without exception, I/P transducers of the prior art have moving parts such as a voice coil disposed in operative relationship with a permanent magnet or magnets. Problems associated with moving parts within an I/P transducer are many.

First, moving parts having a relatively significant mass that invariably makes conventional I/P transducers susceptible to hysteresis and deadband because of the requirement of moving the mass, which means that the instrument has poor repeatability. Poor repeatability means less accuracy and precision, and this ultimately results in poor control of the system.

Secondly, the response of I/P transducers of the prior art with moving parts is susceptible and greatly affected by vibration, shock, and change in orientation or attitude. Because the elements of the I/P transducer that produce the output pressure signal are moving parts, vibration, shock or change in attitude or orientation will result in these elements moving. Consequently, the response in situations involving vibration, shock, change in attitude or orientation is not accurate and precise. Again the net result is that the I/P transducer does not accurately and precisely convert the current signal to a correct proportional pressure signal and, there is error in the final control.

Besides the problems associated with the moving parts, most conventional I/P transducers include permanent magnets. These permanent magnets are the source of an additional shortcoming of conventional I/P transducers. Over a period of time, the permanent magnet or magnets experience a degradation in strength that, of course, directly affects the accuracy and precision of the instrument.

Further, most conventional I/P transducers require some type of damping medium. In this regard, some conventional I/P transducers, for example, require oil as the damping medium. This obviously requires the I/P transducer to require maintenance and service.

Finally, I/P transducers of the prior art are big, bulky and often relatively expensive. The size and mass of the I/P transducer is an important consideration since they most often are required to fit in existing panel designs where space is often minimal.

SUMMARY AND OBJECTS OF THE PRESENT INVENTION

The present invention entails a compact, electromagnetic-pneumatic current to pressure transducer that overcomes the shortcomings and disadvantages of the I/P transducers of the prior art.

More particularly, the I/P transducer of the present invention is designed to receive an input air supply and to vary the volume of the air flowing into the transducer so as to vary the pressure flowing from the air supply to the control mechanism. This is accomplished by means of a membrane movable with respect to the air inlet or nozzle of the transducer for varying the amount of air flowing into and through the transducer. In order to provide sensitive output control with minimum energy input, an extremely low mass non-magnetic plastic membrane is provided. One suitable material for the membrane is Kapton ®. Attached to the upper surface of the plastic membrane is a magnetic disk or "button".

The housing may be made entirely of magnetic material or may include a nonmagnetic valve seat. An input current signal, preferably from four to twenty mA (milliamperes) causes movement of the membrane relative to the valve seat to vary the pressure in the air line to effectively produce an output air pressure proportional to the input current signal.

It is therefore, an object of this invention to provide in an I/P transducer having an air input forming a nozzle extending through the housing and forming a valve seat and a membrane movable with respect to the housing vary the flow of air therethrough wherein at least a portion of a membrane and a portion of the housing are of magnetizable material to function as an electromagnet upon application of an input electrical signal.

It is another object of this invention to provide an I/P transducer of the type described wherein the housing is principally made of magnetic material and wherein only the valve seat portion thereof is of nonmagnetic material. Furthermore, the membrane is plastic and has a magnetizable button located thereon, whereby less electrical power is required to modulate the position of the membrane relative to the valve seat.

It is another object of the present invention to provide an I/P transducer that is compact and relatively inexpensive.

A further object of the present invention resides in the provision of an I/P transducer that has virtually no moving parts.

Still a further object of the present invention resides in the provision of an I/P transducer that is insensitive to vibration, shock, orientation and attitude.

Another object of the present invention resides in the provision of an I/P transducer that is repeatable, precise and extremely accurate.

It is also an object of the present invention to provide an I/P transducer that overcomes the problems of hysteresis and deadband commonly found in current to pressure transducers of the prior art.

Still a futher object of the present invention resides in the provision of an I/P transducer that is relatively simple and easy to install and maintain.

A further object of the present invention resides in the provision of an I/P transducer wherein an input current signal is utilized to generate a magnetic force that is directed against a membrane having a magnetizable portion which in turn is operative to control the pressure of a fluid flow passing from the valve wherein the control pressure of the output fluid flow is proportional to the input current signal.

Another object of the present invention resides in the provision of an I/P transducer of the character referred to above that utilizes an input current signal to generate a magnetic force within the transducer itself that positively acts on a flowing system of air to produce an output pressure that is proportional to the input current signal.

It is also an object of the present invention to provide an I/P transducer of the character referred to above that has a relatively quick response time.

Still a further object of the present invention resides in the provision of an electro-pneumatic transducer that operates independently of polarity.

It is also an object of the present invention to provide an I/P transducer that is inherently stable, accurate and precise over a relatively long period of time.

Another object of the present invention resides in the provision of an I/P transducer that has the capability of electromagnetically loading a magnetizable portion of a low mass membrane that acts on a fluid flow to produce a pressure signal proportional to an input current signal.

Other objects and advantages of the present invention will become apparent from a study of the following description and the accompanying drawings which are merely illustrative of the present invention.

DETAILED DESCRIPTION OF ILLUSTRATED EMBODIMENTS

I/P Transducer

Figure 1:
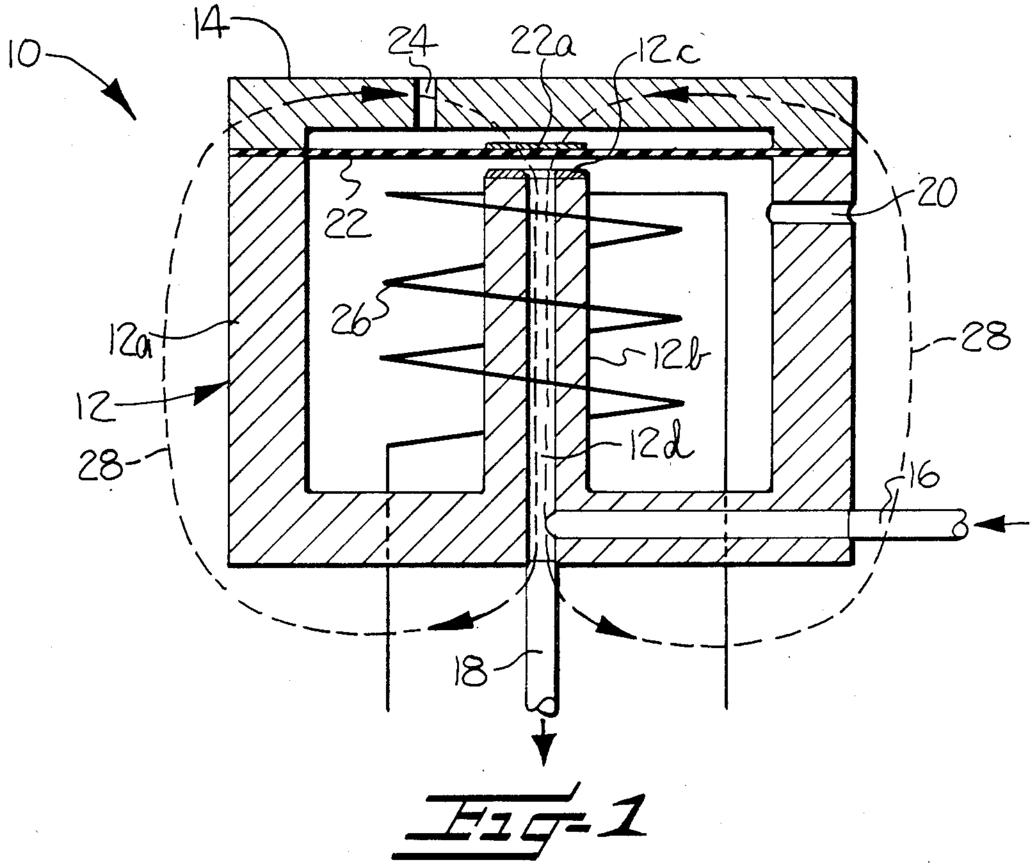
FIG. 1 is a transverse sectional view of the basic I/P transducer module of the present invention.

With particular reference to the drawings, the electro-pneumatic I/P transducer of the present invention is shown therein and indicated generally by the numeral 10. Yiewing I/P transducer 10 in more detail, the same is provided in the form of a magnetic housing which may be of 400 series stainless steel or other suitable magnetic materials. The housing or housing means includes a first or bottom section 12 and a top or second section 14 and is generally cylindrical.

Viewing bottom section 12, it is seen that the same includes an annular side wall 12*a* and a central post 12*b* extending upwardly about the center thereof. Air inlet means is provided by a bore 12*d* communicating with the inlet 16 and the interior of the chamber defined by the housing. The top or nozzle opening portion of the center post 12*b* may be of non-magnetic material or of magnetic material forming a valve seat 12*c*. Annular wall 12*a* and center post 12*b* form what is referred to herein as an E core. The significance of this defined E core will become apparent from subsequent portions of this disclosure.

Continuing to refer to the first or bottom section 12, it is seen that the same is provided with inlet means in the form of a supply inlet 16 that includes the bore 12*d* that extends through the lower portion of the transducer housing and completely up and through central post 12*b*. Communicatively connected to the supply inlet 16, preferably at the lower end of the base 12*d*, is an outlet means or output port 18 that is operative to direct portions of the fluid supply from the transducer. This output is utilized to drive a mechanical valve or other flow control mechanism.

In addition, there is provided a low port 20 formed in the annular wall 12*a* that allows supply air passing through the transducer to exit to the atmosphere.

As seen in the drawings, held between the top section 14 and bottom section 12 of the housing is membrane means or membrane 22. The membrane 22 includes a magnetizable portion or button 22*a* and a plastic or nonmagnetizable portion 22. The button 22*a* is positioned above the valve seat 12*c* and may be formed of materials such as Mollypermalloy ® manufactured by Carpenter Steel Corp. of Pennsylvania. In the present case the button is 0.25 mils thick and has a diameter of about 0.25 inch. In the present embodiment, the magnetizable portions of the housing 12, 14 are formed of 400 series stainless steel or may be of other suitable magnetic materials.

Formed in the top 14 of the I/P transducer is a zero-adjust port 24.

Wrapped around the center post 12*b* of the formed E core is electric coil means or a wire winding 26. The present I/P transducer 10 is designed to accommodate an input current signal of four to twenty milliamps and it is contemplated that the wire windings 26 would include approximately 4000 turns of number 32 gauge wire. It will be appreciated that the wire windings 26 would extend through the annular wall 12*a* of the I/P transducer and would operatively connect to a current signal source.

To accommodate means for imparting a current signal to the coil means in the form of four to twenty mA (for a span of 16 mA), the transducer is designed such that the vertical distance from the top of valve seat 12*c* to the bottom of membrane 22 is approximately 0.007 inches. Likewise, the distance between the lower surface of top 14 to membrane 22 is approximately 0.003 inches. This spacing results in a possible output pressure in the range of 3–15 psi. Thus the upper portion of the magnetizable center post 12*b* forms one pole while the bottom side of the top 14 forms another pole. The combination of the coil means 26, the magnetic button 22*a* and the upper portion of the magnetizable center post 12*b* forms the electromagnetic means for actuating the membrane.

In operation the basic operation of the I/P transducer 10, a supply fluid, typically air at 20 psig is directed into the fluid ingress means or supply port 16. This supply air is directed into the transducer 10 and up through the central post 12*b* where the air is dispersed out and over the valve seat 12*c* and underneath and around membrane 22. This air exits the I/P transducer through low port 20. It is appreciated that some of the supply air is directed through fluid egress means or output port 18.

The presence of an input current signal through wire windings 26 results in a magnetic field occurring throughout the I/P transducer as indicated by magnetic flux lines 28 in FIG. 1. The flux density concentrates on the area of the circuit having the smallest surface area. In this case, the top of center post 12*c* has the smallest surface area and as a result, upon excitation of the coil, the membrane 22 is attracted to the valve seat 12*c*. Because of the design of the I/P transducer 10 of the present invention and particularly the design of the E core and its components with respect to top 14, the resulting magnetic force tends to act and load the membrane downwardly as viewed in FIG. 1. This downward loading results is a restriction being placed on the air passing over the valve seat 12*c* to the outer side areas of the valve. This restriction causes a correspondingly proportional pressure increase at output port 18. In the design of the I/P transducer 10 of the present invention, the presure found or sensed at the output port 18 is proportional to the current signal directed through the wire windings 26. For an increase in the current signal directed through the wire windings 26, there is a proportional pressure increase in the fluid flow at output port 18 due to the loading of membrane 22 by the resulting magnetic field.

Figure 2:
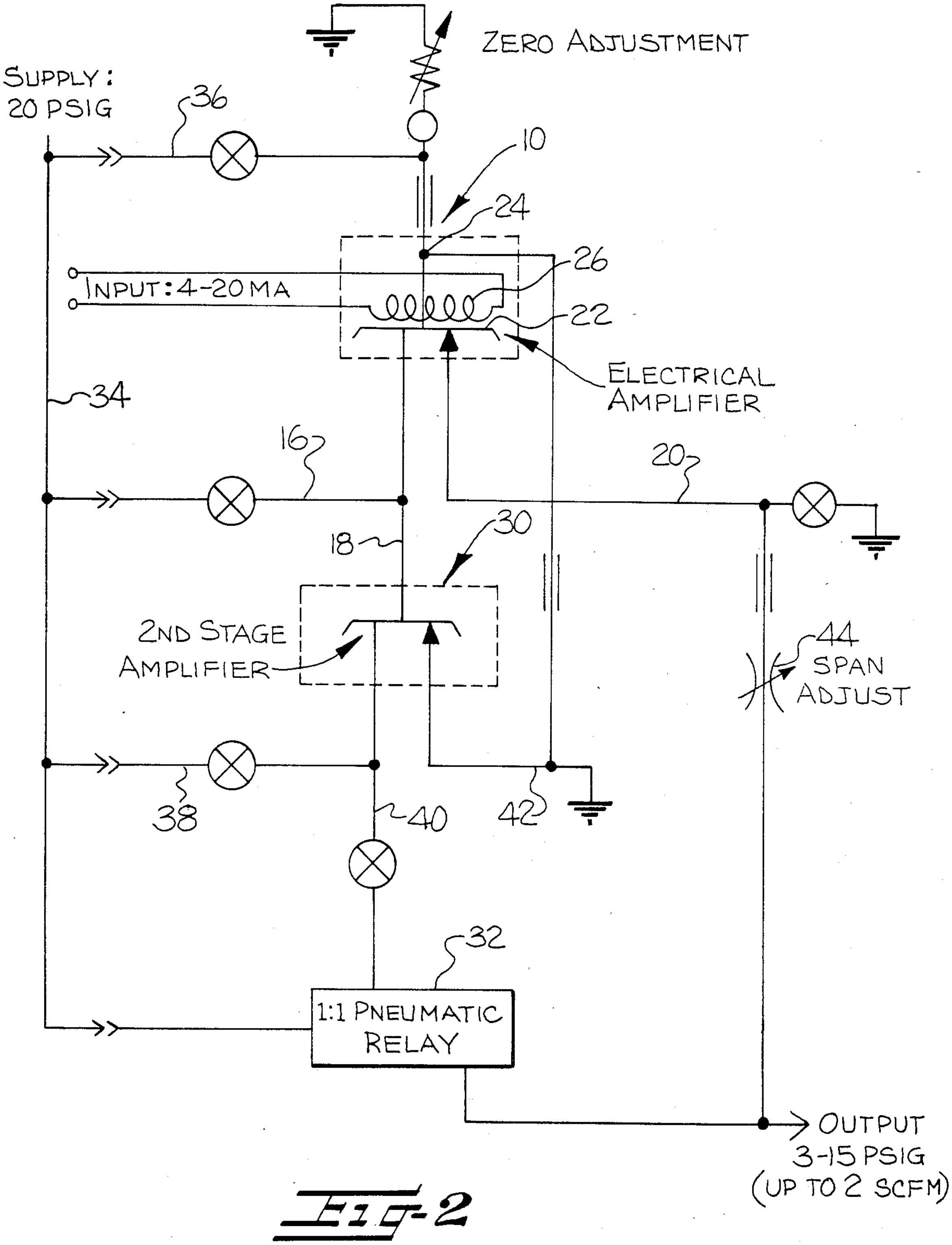
FIG. 2 is a schematic illustration of an I/P transducer design incorporating a pneumatic amplifier along with a span adjustment circuit.

Turning to FIG. 2, there is illustrated schematically an I/P transducer design utilizing the basic I/P transducer module 10 described hereinbefore.

In FIG. 2, a 20 psig supply line 34 feeds a supply flow into port 16 in the base of I/P transducer 10. As already described, the fluid input, which is typically air, is directed from line 16 up through central post 12*b* where the air is dispersed over the valve seat 12*c* and out low port 20.

In FIG. 2, the illustration of I/P transducer 10 is schematic. Therein, the wire windings 26 for purpose of illustration are shown disposed on either side of membrane 22 inasmuch as the basic intent of loading membrane 22 for producing a proportional output pressure can be achieved with the wire windings 26 disposed on either side thereof.

Continuing to refer to the basic operation of the transducer design as illustrated in FIG. 2, it is appreciated that while an air flow passes through the I/P transducer 10, that an input current signal typically from four to twenty milliamps is being directed through the wire windings 26. This input current signal causes a magnetic field to be generated about the transducer 10. Reference is made to the magnetic flux lines 28 illustrated in FIG. 1. Because a portion of membrane 22 has magnetic properties, the generated magnetic field acts to load the same. This loading effect directly affects and determines an output pressure which in the case of this design is the pressure of the output fluid flow flowing in line 18.

It is seen that main supply line 34 also feeds line 36 which directs an input pressure signal to I/P transducer 10. In the case of the present design, this input pressure signal serves to "zero" the I/P transducer. This is typically achieved by directing a selected input current signal, in this case four milliamps, through the wire windings 26 and adjusting the input pressure into port 24 until the desired output pressure from output port 18 is reached.

As a practical matter, the pressure signal found in line 18 requires amplification in order to be easily and efficiently utilized.

To achieve this, the I/P transducer design illustrated in FIG. 2 is shown with a conventional pneumatic amplifier, indicated generally by the numeral 30. Details of pneumatic amplifier 30 are not dealt with herein in detail because such is known and appreciated in the prior art. For a complete and unified understanding of such, one is referred to the disclosure found in U.S. Pat. No. 3,844,529, the disclosure being expressly incorporated herein by reference. This patent discloses the basic pneumatic amplifier "pi-valve" manufactured by Brandt Industries, Inc., of Triple W Air Park, Fuquay-Varina, N.C. 27526.

In effect, this pneumatic amplifier 30, which also utilizes a membrane, acts to amplify the output pressure signal of the I/P transducer module 10. In the present design, air flow line 38 serves as a supply input to amplifier 30 and the same has a communicatively joined output 40 and a low port line 42 that leads to ground atmosphere). Essentially what occurs is that the output signal of the I/P transducer 10 found in line 18 is directed into amplifier 30 as an input pressure signal. Amplifier 30 acts to amplify this input signal to an output pressure signal found in line 40.

To boost the output pressure signal in line 40, a pneumatic relay 32, of a conventional type, is utilized. Pneumatic relay 32 simply boosts the pressure signal directed thereto. It is understood and appreciated that the boosted pressure signal leaving pneumatic relay 32 is still proportional to the input current signal received by the I/P transducer module 10.

In order to adjust for span, portions of the flow being directed from the pneumatic relay 32 are directed through a variable flow restrictor span adjustment 44 prior to joining the low port ground line 20 of the I/P transducer module 10. By effectively dumping a portion of the final output flow back through the low port line 20 and to ground or atmosphere, one can adjust the span of the I/P transducer module. For example, after properly zeroing, the input current signal can be changed to another selected current signal such as 20 milliamps. With this input current signal, the variable flow restrictor span adjustment means or variable flow restrictor 44 is adjusted such that the output pressure of flow leaving pneumatic relay 32 is at a desired magnitude, which in this case would be 15 psig. Consequently, for any given input signal from four to twenty milliamps, there would be a proportional output pressure signal produced from three to fifteen psig.

In the present disclosure, reference has been made to both fluid flow and air. It is appreciated that the amplifier valve 30 and the I/P transducer 10 of the present invention is basically designed to accommodate fluid flow. As a practical matter, air is typically used as a supply fluid although other fluids may very well be utilized.

In addition it is appreciated that certain specifications referred to herein will change and vary depending on the input current signal range and the desired pressure output.

In a further embodiment of the invention, a transducer is created from the combination of the hereinbefore described E-pi valve 10 and an accompanying closed loop electronic control circuit. This circuit uses less than 5 mW of electrical energy and has a pneumatic consumption of less than 0.03 scfm, thus making it highly efficient insofar as both electrical and air consumption are concerned. Since the electrical consumption is very low, there is power available from the input current signal to operate a silicon pressure sensor and associated electronics. In addition, this electrical circuit allows for amplification greater than that of the pneumatic circuit disclosed in FIG. 2. The controlled air pressure is boosted to the desired level and this boosted air pressure is measured electronically by a pressure sensor which produces an output current proportional to the controlled air pressure. The instant embodiment includes a number of switch functions including direct, reverse, split range, etc. and any deviation from the programmed switch function is automatically corrected to a very precise output pressure.

Figure 3:
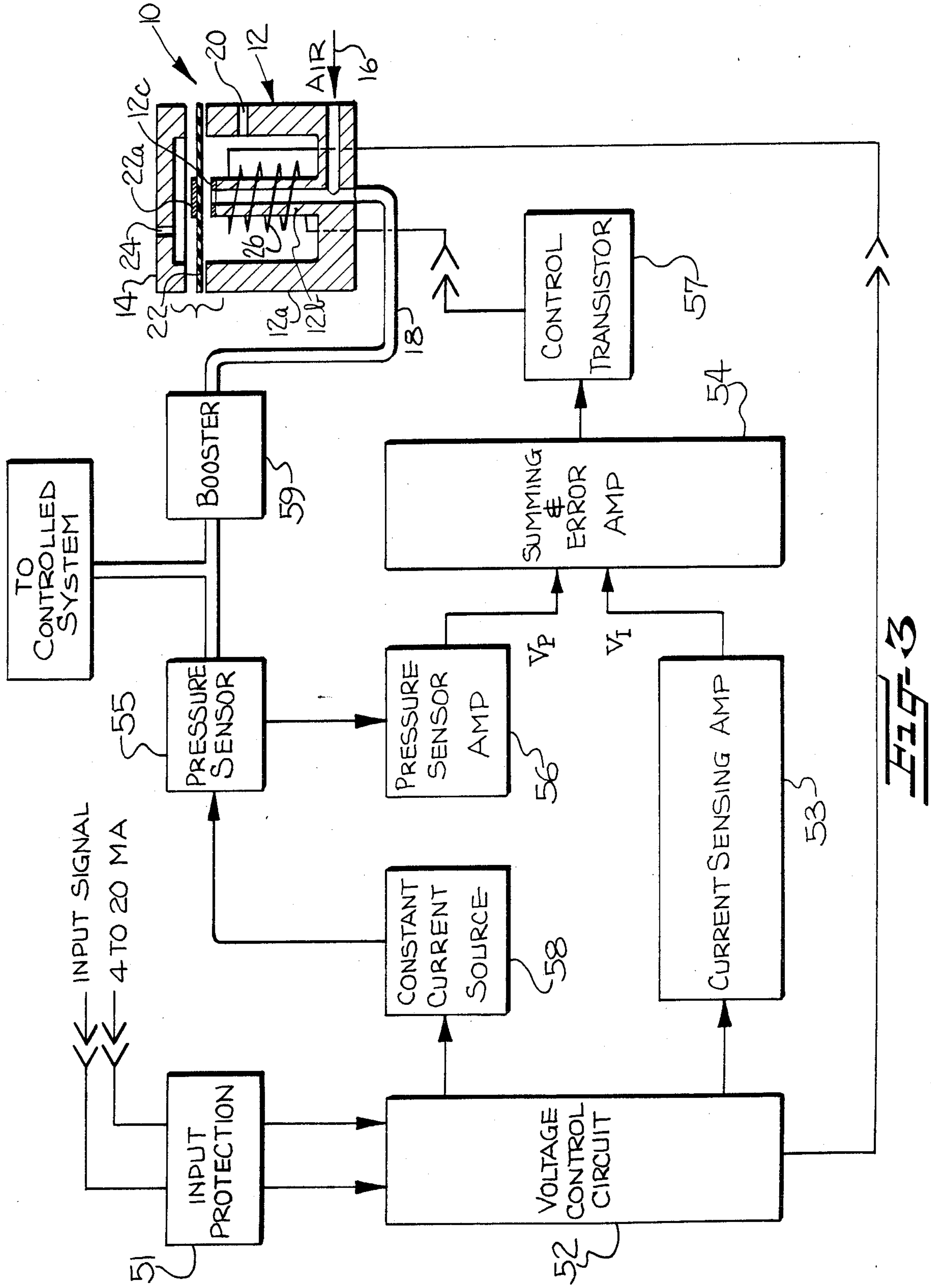
FIG. 3 is a schematic illustration of an I/P transducer design incorporating a closed loop electronic control circuit including a pneumatic booster.

FIG. 3 illustrates the pressure control circuit, which when used in combination with an E-pi valve, is designed to take a set electrical input current signal and to convert it into a desired, carefully controlled proportional output pressure. The circuit monitors both the input current signal and the output pressure, compares these values electronically, and adjusts the current through the E-pi coil to arrive at, and control, the desired output pressure.

In the circuit of FIG. 3 a current signal in the range of 4 mA DC to 20 mA DC is supplied by the end user to the circuit for obtaining the desired corresponding controlled output pressure.

It will be understood from the description of the electronic control circuit that follows, that all of the subcircuits which will be described are well-known to persons of ordinary skill in the appropriate arts and that an in depth discussion of each will therefore be unnecessary.

A first means for producing an output proportional to the input signal comprising an input protection circuit, a voltage control circuit and a current sensing amplifier is provided. The input signal (typically current) first enters the input protection circuit 51 which protects the total pressure control circuit (FIG. 3) from voltage transients and is technically a part of the voltage control circuit 52 however, it will be discussed separately herein. The input protection circuit protects the pressure control circuit from voltage transients by clamping the circuit and allowing only a 40 mA maximum through the pressure control circuit. Therefore, the input protection circuit may be viewed conceptually as a device where I in=I out under normal transient-free operating conditions.

The voltage control circuit 52 acts like two perfect Zenor diodes and supplies rail voltage (VR) and reference voltage (VD) for the circuit to operate. The voltage control circuit is designed to keep both the VR and VD voltages at constant values.

A second means for producing an output proportional to the transducer output pressure; comprising the output booster, pressure sensor and pressure sensor amplifier is provided.

When the pressure control circuit is operating, two distinct operations are in progress and are occurring simultaneously. First, the current sensing amplifier is monitoring the total current flowing through the pressure control circuit VR or VD and is converting it to a voltage signal which is supplied to the negative side of the summing and error amplifier circuit 54.

Second, the pressure sensor 55 is monitoring the boosted output pressure of the E-pi valve. The output pressure is boosted by a conventional booster 59, such as the Brandt Instruments 5A01-021 unit. The boosted output is directed to controlled system as well as the pressure sensor 55. As the pressure sensor monitors the output pressure, it uses the output signal from the constant current source to convert the pressure reading into two floating voltage outputs. These voltage outputs are the inputs of the pressure sensor amplifiers. The output pressure signal from the E-pi valve is converted to a proportional voltage signal in pressure sensor 55. The pressure sensor 55 is a device having a pressure input and a proportional voltage output which is received by amplifier 56. The pressure sensor is rated at 3–15 psi and has a millivolt rating of 75–125 millivolts. One such device is manufactured by IC Sensors, Inc., model no. 10A. This voltage signal is, in turn, supplied to the negative input to the means for comparing the difference between the input signal and the transducer output signal or summing error amplifier 54.

The summing and error amplifier 54 receives input signals from pressure sensor amplifier 56 and from current sensing amplifier 53 and compares these two signals for the desired ralationship. This produces an output voltage or control signal from summing and error amplifier 54 which is proportional to the difference between the voltages present at its inputs.

The control transistor 57 is driven by the error signal output from the summing and error amplifier 54. It controls the induction voltage through the coil of the E-pi valve 10 such that the voltage is directly proportional to the desired pressure signal, and includes a correction factor as generated by the feedback loop or error signal. Thus, the air pressure output with the input current signal supplied by the end user. The E-pi valve controls and maintains the output pressure based on the induction voltage from the output transistor 57.

In the steady state operation of the closed loop control circuit of FIG. 3, the voltage signal (VP) from the pressure sensor amplifier 56 is equal to the voltage signal (VI) from current sensor amplifier. In this case, the induction of the coil remains constant, and in turn the output of the E-pi valve will remain constant as the current input is equal to the desired pressure output.

In another operating condition, the voltage signal from pressure sensor amplifier 56 is less than the voltage from current sensor amplifier 53, thus the output pressure is less than the set input current. The operation of the feedback circuit senses this deficiency and the summing error amplifier voltage signal output increases, causing a corresponding increase in the current output in control transistor 57. This in turn causes the induction in the E-pi valve coil to increase, causing the button **22*a* to move closer to the valve seat 12*c* (FIG. 1) and increasing the output pressure. As the output pressure increases, the pressure sensor monitors, and notes the increase, thus increasing the VP signal to the summing and error amplifier 54**. The voltage VP continues to increase until such time as the feedback loop senses that VP equals VI, at which point the desired current to pressure state has been achieved. This reduces the current output of transistor 57 so that the valve will operate in ts steady state condition.

In another operating condition of the instant electronically controlled closed loop transducer circuit the voltage signed from the pressure sensor amplifier 56 (VP) is greater than the voltage from the current sensor amplifier 53, thus the desired transducer output is greater than the set input current. In this case, in order to bring the transducer output pressure back to the desired level, the summing and error amplifier 54 voltage signal output falls, causing the conductive state of control transistor 57 to decrease. This decrease in the control transistor signal reduces the current, and hence the inductance in the coil 26, which causes the button 22a to move away from the valve seat 12c and decreasing the output pressure. When the desired steady state occurs (at the summing and error amplifier VP=VI), an equal current to pressure state has been achieved and the output of amplifier 54 remains constant, causing the output of transistor 57 to remain constant, causing the button 22a to remain positioned a fixed distance away from the top of valve seat 12c.

Those readers skilled in the art will recognize that the pressure control circuit of the instant invention may be modified in a number of ways. For example, the pressure output by the E-pi valve may be controlled so as to be inversely proportional to the input current signal by reversing the connections of VP and VI into the summing and error amplifier 54. In addition, the pressure control circuit may be modified so as to operate in a split range mode wherein the ratio to input current to output pressure may be varied by varying the ratio between the resistance in the current sense resistors of the constant current source circuit.

The present invention, of course, may be carried out in other specific ways than those herein set forth without departing from the spirit and essential charactristics of the invention. The present embodiments are, therefore, to be considered in all respects as illustrative and not restrictive, and all changes coming within the meaning and equivalency range of the appended claims are intended to be embraced therein.

What is claimed is:

1. An electro-pneumatic transducer for converting an input current signal to a proportional output pressure signal characterized by its low power consumption, said transducer comprising:

housing means and having magnetizable top and bottom sections, defining a chamber, the bottom section having a center post extending into the chamber;

said center post defining inlet means in the housing communicating with said chamber for supplying fluid under pressure thereto and having a valve seat with a nozzle opening therethrough;

outlet means communicating with said inlet means for allowing fluid supplied by said inlet means to flow to a control device;

flexible membrane means between the top and bottom sections of the housing means extending across the chamber in overlying relation to said nozzle opening and defining air gaps above and below said membrane and movable for varying the fluid flow through the nozzle opening to thereby vary the fluid pressure at the outlet means;

said membrane means being essentially non-magnetic and having a magnetic portion adjacent the valve seat;

electric coil means wound around the center post; and said coil means being operable upon a current signal being imparted thereto to generate a magnetic field to magnetize the magnetic portions of the membrane and the housing, the degree of magnetization being proportional to the input current signal to position the membrane relative to the valve seat proportional to the input signal, said magnetic portion of the membrane being positioned to cause the majority of the flux to pass through top of the housing, the air gap above said membrane, the magnetic portion of the membrane, and through the valve seat, whereby the transducer output may be carefully and accurately controlled by modulating the membrane between using a minimum of electrical energy.

2. An electro-pneumatic transducer, adapted for use with a fluid supply line having an input reference pressure and an output control pressure, for converting an input current signal to a proportional output control pressure, said transducer characterized by its low power consumption and comprising:

housing means having a top section and a bottom section and defining a chamber and being formed primarily of magnetic material, the bottom section of said housing including a center post and defining with the bottom section of the housing an E-core, said center post having a bore therethrough communicating at its outer end with the input fluid pressure reference and with output control pressure reference, and at its inner end with the chamber;

the end of the center post having a nozzle opening therein;

the end of the center post forming a valve seat;

flexible membrane means between the top and bottom sections of the housing means extending across the chamber in overlying relation to said nozzle opening and defining air gaps above and below said membrane disposed within said chamber and in operative association with the valve seat and movable for varying the fluid flowing into the chamber through the valve seat, said membrane means being essentially non-magnetic and having a magnetic portion adjacent the valve seat;

electric coil means wound around the center post; and said coil means being operable upon a current signal being imparted thereto to generate a magnetic field to magnetize the magnetic portions of the membrane and the housing, said magnetic portion of the membrane being positioned to cause the majority of the flux to pass through the top of the housing, the air gap above the membrane, the magnetic portion of the membrane and through the valve seat, the degree of magnetization being proportional to the input current signal to position the membrane relative to the valve seat proportional to the input signal, whereby output control pressure may be carefuly and accurately controlled using a minimum of electrical energy.

3. The electro-pneumatic I/P transducer of claim 2 wherein said means for imparting an input current signal into said housing for effectively electromagnetically loading said membrane comprises a wire coil that is operative to generate a magnetic field in response to an electrical current passing therethrough, wherein the electric field yields a magnetic force that is operative to load said membrane which in turn acts upon fluid flow passing in operative relationship with said housing to produce an output that may be carefully and accurately controlled using a minimum of electrical energy.

4. An electro-pneumatic transducer according to claim 3 wherein said electrical wire coil surrounds the center post.

5. An electro-pneumatic transducer for converting an input current signal to a proportional output pressure signal characterized by its low power consumption, said transducer comprising:

housing means defining a chamber and having magnetizable top and bottom sections, the bottom section having a center post extending into the chamber;

said center post defining inlet means in the housing communicating with said chamber for supplying fluid under pressure thereto and having a valve seat with a nozzle opening therethrough;

outlet means communicating with said inlet means for output flow of said fluid supplied by said inlet means to a control device;

flexible membrane means between the top and bottom sections of the housing means extending across the chamber in overlying relation to said nozzle opening and defining air gaps above and below said membrane disposed within said chamber in operative association with the nozzle opening and movable with respect to the valve seat for loading the fluid flow through the nozzle opening to thereby vary the fluid pressure at the outlet means;

said membrane means being essentially non-magnetic and having a magnetic portion adjacent the valve seat;

electric coil means wound around the center post;

said coil means being operable upon a current signal being imparted thereto to generate a magnetic field to magnetize the magnetic portions of the membrane and housing, the degree of magnetization being proportional to the input current signal to position the membrane relative to the valve seat proportional to the input signal, said magnetic portion of the membrane being positioned to cause the majority of the flux to pass through the top of the housing, the air gap above said membrane, the magnetic portion of the membrane and through the valve seat;

said housing also having a low port in fluid communication with the nozzle opening and a ground line communicating with the low port; and a span adjustment circuit including a variable flow restrictor span adjustment means positioned between said outlet means of the transducer and said low port for transmitting a portion of the output fluid flow back through the low part to adjust the span of the transducer, whereby the transducer output may be carefully and accurately controlled using a minimum of electrical energy.

6. An electro-pneumatic transducer and central circuit according to claim 5 including, a pneumatic amplifier and a pneumatic relay interposed between said outlet means and said variable flow restrictor span adjustment means.

7. A pneumatic control circuit for an elector-pneumatic transducer wherein the transducer has a housing having top and bottom sections and forming a chamber with means for ingress and egress of a supply fluid, said ingress means defined by a center post in the bottom section extending into said chamber having a valve seat in the chamber, said housing also having an essentially non-magnetic flexible membrane extending across said chamber, said membrane being in overlying relation to said valve seat and defining air gaps above and below said membrane, said membrane having a magnetic portion adjacent the fluid supply inlet means, said membrane being movable against the flow of supply fluid for modulating the outward pressure of said fluid in the egress means, and electromagnetic means for actuating said membrane comprising a coil wound around the center post, said magnetic portion of the membrane being positioned to cause the majority of the flux to pass through the top of the housing, the air gap above said membrane, the magnetic portion of the membrane, and through the valve seat, said control circuit comprising a pneumatic amplifier connected to the fluid egress means; and a pneumatic relay connected to the pneumatic amplifier and to the system to be controlled by the transducer, whereby the input of the electromagnetic means is proportional to the output of the pneumatic relay.

8. A pneumatic central circuit for an electropneumatic transducer according to claim 7 wherein said housing further comprises a low port communicating with the chamber and wherein span adjustment means are connected to the low port and the pneumatic relay output for adjusting the input current span such that the desired output pressure of flow leaving the pneumatic relay is at a desired magnitude.

9. An electro-pneumatic transducer according to claim 1, 2 or 5 wherein the bottom section of said housing includes a center post means which forms one pole and the top section of the housing forms the other pole, wherein the location of the membrane means is proportional to the magnitude of current present in the electric coil means.

10. An electro-pneumatic transducer for converting an input current signal to a proportional output pressure signal characterized by its low power consumption, said transducer comprising:

housing means having magnetizable top and bottom sections defining a chamber the bottom section having a center post extending into the chamber;

said center post defining inlet means in the housing communicating with said chamber for supplying fluid under pressure thereto and having a valve seat with a nozzle opening therethrough;

outlet means communicating with said inlet means for allowing fluid supplied by said inlet means to flow to a control device;

flexible membrane means disposed across said chamber between said top and bottom sections of said housing means and defining air gaps above and below said membrane, said membrane means being positioned in overlying relation to the nozzle opening in the valve seat for varying the flow fluid through the nozzle opening to thereby vary the fluid pressure at the outlet means;

said membrane means being essentially non-magnetic and having a magnetic portion adjacent the valve seat;

electric coil means wound around the center post;

said coil means being operable upon a current signal being applied thereto to generate a magnetic field to magnetize the magnetic portions of the membrane and housing, the degree of magnetization being proportional to the input current signal, said magnetic portion of the membrane being positioned to cause the majority of the flux to pass through the top of the housing, the air gap above said membrane, the magnetic portion of the membrane and through the valve seat to position the membrane relative to the valve seat proportional to the input signal;

first means for producing an output proportional to the input signal;

second means for producing an output proportional to the transducer output pressure; and means for comparing the difference between the input signal and the transducer output pressure signal and producing a control signal proportional to the difference therebetween.

11. An electro-penumatic transducer, adapted for use with a fluid supply line having an input reference pressure and an output control pressure, for converting an input current signal to a proportional output control pressure, said transducer characterized by its low power consumption and comprising:

housing means having top and bottom sections forming defining a chamber and being formed primarily of magnetic material, said housing having a center post defining with the bottom section of the housing an E-core, said center post having a bore therethrough communicating at its outer end with the input fluid pressure reference and with the output control pressure reference, and at its inner end with the chamber;

the end of the center post forming a valve seat with a nozzle opening therein;

electric coil means wound around said center post;

flexible membrane means disposed across said chamber between the top and bottom sections of the housing defining air gaps above and below said membrane and in overlying relation to the valve seat, said membrane means being essentially non-magnetic and having a magnetic portion adjacent the valve seat for varying the fluid flowing into the chamber through the valve seat, proportional to the input current signal applied to the coil, the magnetic portion of said membrane means being positioned to cause the majority of the flux to flow through the top of the housing, through the air gap above the membrane, the magnetic portion of the membrane and through the valve seat whereby output control pressure may be carefully and accurately controlled using a minumum of electrical energy;

first means for producing an output proportional to the input signal;

second means for producing an output proportional to the transducer output pressure; and means for comparing the difference between the input signal and the transducer output pressure signal and producing a control signal proportional to the difference therebetween.

12. An electronic control circuit according to claim 10 or 11 wherein the first means converts an input current signal to a proportional output voltage signal and further wherein the second means converts the transducer output pressure signal to a proportional voltage signal, both of said signals forming inputs and producing a voltage control signal output proportional to the difference between said input signals.

13. The electro-pneumatic I/P transducer of claim 1, 2 or 5 wherein said housing means includes a second inlet formed therein opposite said chamber wherein a pressure signal may be received therethrough and applied against said membrane for zeroing or adjusting said I/P transducer.

14. An electro-pneumatic transducer for use with a fluid supply line having an input reference pressure and an output control pressure for converting an input current signal to a proportional output control pressure, said transducer characterized by its low power consumption and comprising:

housing means defining a chamber including a top, a bottom and a surrounding side wall structure, said housing means being of magnetic material and of a two piece construction;

said housing means including a center post in the bottom thereof, said center post having a bore therethrough communicating at its outer end with an input pressure reference and with the output control pressure, and at its inner end with the chamber;

the end of the center post having a nozzle opening therein;

plastic flexible membrane means disposed across said chamber between the top section and the center post portion of the bottom section in a sandwiched fashion and positioned so as to overlie said nozzle opening in the valve seat and defining air gaps above and below said membrane for varying the position of the membrane relative to the nozzle opening to control the fluid flow through the nozzle opening to thereby vary the output control pressure;

said membrane means being essentially non-magnetic and having a magnetic portion adjacent the valve seat;

a wire coil winding surrounding the center post and operative to generate a magnetic field in response to an electrical current passing therethrough, wherein the magnetic field yields a magnetic force that is operative to load the said magnetic membrane; said magnetic portion of the membrane being positioned to cause the majority of the flux to pass through the top of the housing, the air gap above the membrane, the magnetic portion of the membrane and through the valve seat, which in turn acts upon the input pressure reference to produce a proportional output control pressure, whereby the transducer output may be carefully and accurately controlled using a minumum of electrical energy.

15. A transducer according to claim 1, 2, 5, 10, 11 or 14 wherein the valve seat of said housing means is formed of non-magnetic material.

* * * * *